United States Patent [19]

Nickle et al.

[11] Patent Number: 5,314,945
[45] Date of Patent: May 24, 1994

[54] WATERBASED COATING COMPOSITIONS OF METHYLOL(METH)ACRYLAMIDE ACRYLIC POLYMER, POLYURETHANE AND MELAMINE CROSSLINKING AGENT

[75] Inventors: Stanley K. Nickle, Blackwood, N.J.; Ervin R. Werner, Jr., Levittown, Pa.

[73] Assignee: E. I. du Pont de Nemours and Company, Wilmington, Del.

[21] Appl. No.: 920,404

[22] Filed: Jul. 27, 1992

Related U.S. Application Data

[63] Continuation-in-part of Ser. No. 620,894, Dec. 3, 1990, abandoned.

[51] Int. Cl.$^5$ .................... C08F 20/58; C08L 75/06
[52] U.S. Cl. .................... 524/507; 524/555; 525/131; 525/218
[58] Field of Search ............ 524/507, 555; 525/131, 525/228

[56] References Cited

U.S. PATENT DOCUMENTS

| | | | |
|---|---|---|---|
| 3,248,260 | 4/1966 | Langerak et al. | 117/161 |
| 3,288,740 | 11/1966 | Maeder et al. | 260/29.6 |
| 3,457,209 | 7/1969 | Mikofalvy | 260/29.6 |
| 3,532,611 | 10/1970 | Takiguchi et al. | 204/56 |
| 3,580,876 | 5/1971 | Stone et al. | 260/29.4 |
| 3,624,020 | 11/1971 | Klebert et al. | 260/29.6 |
| 3,632,787 | 1/1972 | Wilbur | 260/29.6 RW |
| 3,635,867 | 1/1972 | Yuille | 260/29.4 UA |
| 3,697,461 | 10/1972 | Troeger et al. | 260/19 U |
| 3,736,287 | 5/1973 | Patella | 260/29.6 TA |
| 3,749,690 | 7/1973 | Patella | 260/29.6 TA |
| 3,832,317 | 8/1974 | Mikofalvy et al. | 260/29.6 RB |
| 3,925,293 | 12/1975 | Knechtges | 260/29.6 TA |
| 3,925,295 | 12/1975 | Osborn et al. | 260/34.2 |
| 3,935,155 | 1/1976 | Osmond et al. | 260/34.2 |
| 3,969,300 | 7/1976 | Nagata et al. | 260/29.4 UA |
| 3,985,698 | 10/1976 | Matsudaira et al. | 260/29.6 TA |
| 4,002,582 | 1/1977 | Fritsche | 260/4 R |
| 4,008,140 | 2/1977 | Fritsche | 204/181 |
| 4,017,440 | 4/1977 | Kiliam | 260/29.6 HN |
| 4,113,682 | 9/1978 | Nagata et al. | 260/29.4 UA |
| 4,162,240 | 7/1979 | Hino et al. | 260/29.7 B |
| 4,205,152 | 5/1980 | Mizuguchi et al. | 526/265 |
| 4,235,981 | 11/1980 | Tsuchiya | 525/244 |
| 4,246,156 | 1/1981 | Heins et al. | 260/29.7 H |
| 4,276,210 | 6/1981 | Höhlein et al. | 260/29.4 UA |
| 4,318,834 | 3/1982 | Ohmura et al. | 524/457 |
| 4,358,403 | 9/1982 | Distler et al. | 524/745 |
| 4,366,282 | 12/1982 | Zima et al. | 524/317 |
| 4,442,257 | 4/1984 | Borovicka, Sr. et al. | 524/555 |
| 4,444,941 | 4/1984 | Borovicka, Sr. et al. | 524/507 |
| 4,473,678 | 9/1984 | Fink et al. | 524/211 |
| 4,487,859 | 12/1984 | Martino | 523/406 |
| 4,489,135 | 12/1984 | Drexler et al. | 428/423.1 |
| 4,542,181 | 9/1985 | Schuppiser et al. | 524/560 |
| 4,619,964 | 10/1986 | Kielbania et al. | 524/460 |
| 4,623,679 | 11/1986 | Gimpel et al. | 523/410 |
| 4,687,822 | 8/1987 | Eguchi et al. | 526/265 |
| 4,954,559 | 9/1990 | Den Hartog | 524/507 |

FOREIGN PATENT DOCUMENTS

| | | |
|---|---|---|
| 0297576 | 1/1989 | European Pat. Off. . |
| 58-162670 | 9/1983 | Japan . |
| 1240174 | 7/1971 | United Kingdom . |
| 1447203 | 8/1976 | United Kingdom . |

Primary Examiner—Joseph L. Schofer
Assistant Examiner—Jeffrey T. Smith
Attorney, Agent, or Firm—Hilmar L. Fricke

[57] ABSTRACT

A waterbased coating composition containing about 10–30% by weight of film forming binder dispersed in an aqueous carrier; wherein the binder contains about a. 20–85% by weight, based on the weight of the binder, of a methylol (meth)acrylamide carboxyl containing acrylic polymer and the carboxyl groups of the polymer are reacted with ammonia or amine to provide a pH to the composition of about 7.0–10.0;

b. 10–40% by weight, based on the weight of the binder, of a polyurethane which is either a polyester urethane, polyether urethane or polyacrylourethane;

c. 5–40% by weight, based on the weight of the binder of a water-soluble or a water-dispersible alkylated melamine formaldehyde crosslinking agent of a polymeric partially methylated melamine formaldehyde resin having a degree of polymerization of about 1–3;

the composition forms an automotive quality clear coat and/or pigmented color coat for automobiles and trucks; and the acrylic polymer can be used to form an automotive quality primer composition.

19 Claims, No Drawings

WATERBASED COATING COMPOSITIONS OF METHYLOL(METH)ACRYLAMIDE ACRYLIC POLYMER, POLYURETHANE AND MELAMINE CROSSLINKING AGENT

CROSS REFERENCE TO RELATED APPLICATION

This application is a continuation-in-part application of copending application Ser. No. 07/620,894, filed Dec. 3, 1990 now abandoned.

BACKGROUND OF THE INVENTION

This invention is directed to a waterbased coating composition and in particular to a waterbased coating containing a methylol (meth)acrylamide acrylic polymer, a polyurethane and an alkylated melamine crosslinking agent.

Methylol (meth)acrylamide acrylic polymers are polymers containing polymerized monomers of methylol methacrylamide or methylol acrylamide or any mixtures thereof.

Waterbased coating compositions useful for base coats and clear coats for automotive applications are shown in Wilfinger et al U.S. Pat. No. 4,730,020, issued Mar. 8, 1988. Waterbased dispersions of polyurethane are known as shown in Drexler et al U.S. Pat. No. 4,489,135, issued Dec. 18, 1984. Processes for preparing aqueous dispersions of acrylic polyesters are shown in Osborn et al U.S. Pat. No. 3,925,295 issued Dec. 9, 1975 and Osmond et al U.S. Pat. No. 3,935,155 issued Jan. 27, 1976. However, none of the compositions shown in the art form finishes having properties that are required in particular for exterior finishes of automobiles and trucks.

To date, solvent based paints have been the predominant finishes used to coat the exterior of automobiles and trucks. These solvent based paints have excellent adhesion to the substrate and provide properties such as weatherability, gloss, hardness, distinctness of image that are required for the finishes of the exterior of automobiles and trucks. To meet desired standards of reduced solvent emissions and achieve lower baking temperatures to save energy, waterbased paints were suggested for use. However, none of the known water based paints form finishes that have the necessary properties for automotive and truck use along with lower baking temperatures.

SUMMARY OF THE INVENTION

A waterbased coating composition containing about 10–30% by weight of film forming binder dispersed in an aqueous carrier; wherein the binder contains about a. 20–85% by weight, based on the weight of the binder, of a methylol (meth)acrylamide acrylic polymer of polymerized monomers of alkyl methacrylate, alkyl acrylate or mixtures thereof, 1–10% by weight, based on the weight of the acrylic polymer, of methylol methacrylamide, methylol acrylamide or mixtures thereof, 0.5–10% by weight, based on the weight of the acrylic polymer, of an ethylenically unsaturated carboxylic acid, 0.5–10% by weight, based on the weight of the acrylic polymer, of an ethylenically unsaturated hydroxyl containing monomer and the acrylic polymer has a glass transition temperature of −40° to +40° C. and a weight average molecular weight of 500,000 to 3,000,000, the carboxyl groups of the carboxylic acid are reacted with ammonia or an amine to provide a pH of about 7.0–10.0;

b. 0–40% by weight, based on the weight of the binder, of a polyurethane which is either a polester urethane, polyether urethane or polyacrylourethane; and c. 5–40% by weight, based on the weight of the binder, of a water-soluble or a water-dispersible alkylated melamine formaldehyde crosslinking agent of a polymeric partially methylated melamine formaldehyde resin having a degree of polymerization of about 1–3;

the composition forms an automotive quality clear coat and/or pigmented color coat for automobiles and trucks; and the acrylic polymer can be used to form an automotive quality primer composition.

DETAILED DESCRIPTION OF THE INVENTION

The coating composition of the invention is stable for extended periods of time, has a very low VOC (volatile organic content), can be pigmented with all existing commercial pigments used for automobiles and trucks, forms finishes that are hard, glossy, weatherable and durable. In particular, the composition has excellent adhesion to a variety of substrates such as previously painted substrates, cold rolled steel, phosphatized steel, steel coated with conventional primers such as electro-deposition primers that typically are crosslinked epoxy polyesters and various epoxy resin, alkyd resin repair primers, plastic substrates such as polyester reinforced fiber glass, reaction injection molded urethanes and partially crystalline polyamides. A clear coat can be applied to a layer of the pigmented composition to provide a clear/color coat finish. The coating composition used for the clear coat can be the coating composition of this invention or another compatible aqueous or solvent based coating composition.

The coating composition either with or without the polyurethane constituent can be used as a primer over cold rolled steel, treated steel such as phosphatized steel or the aforementioned plastic substrates. The primer provides a surface to which a topcoat will adhere such as a topcoat of the coating composition of this invention as described above.

The coating composition has a film forming binder content of about 10–30% by weight and correspondingly, about 90–70% by weight of an aqueous carrier which is primarily water but often contains small amounts of organic solvents for the binder. The composition may be used as a clear coating composition which may contain very small amounts of pigment to eliminate color such as yellowing. Generally, the composition is pigmented and contains pigments in a pigment to binder weight ratio of about 1:100–200:100.

The film forming binder of the composition contains about 20–85% by weight of the methylol (meth)acrymide acrylic polymer about 10–40% by weight of a polyurethane and about 5–40% by weight of an alkylated melamine formaldehyde crosslinking agent. Preferably, the binder contains about 50–75% by weight of the acrylic polymer, 10–30% by weight of the polyurethane and 5–30% by weight of the crosslinking agent. Preferably, for solid color compositions, i.e. compositions in which metallic pigments such as aluminum flake are not used, the binder contains about 50% acrylic polymer, 30% polyurethane and 20% of the crosslinking agent. For metallic colors, i.e. compositions containing aluminum flake, the binder contains about 60% acrylic polymer, 20% polyurethane and 20% crosslinking agent.

The acrylic polymer is formed by conventional emulsion polymerization by emulsifying a mixture of monomers, water, surfactant and polymerization catalyst and charging the resulting emulsion into a conventional polymerization reactor and heating the constituents in the reactor to about 60°–95° C. for about 15 minutes to 8 hours and then the resulting polymer is neutralized with ammonia or an amine. The size of the polymeric particles of the latex is about 0.06–0.20 microns. The resulting polymer has a hydroxyl no. of 2–100, a glass transition temperature of −40° to +40° C. and a weight average molecular weight of about 500,000–3,000,000.

All molecular weights herein are measured by gel permeation chromatography using polystyrene as the standard.

Typically useful catalysts are ammonium persulfate, hydrogen peroxide, sodium meta bisulfite, hydrogen peroxide sodium sulfoxylate and the like.

Typically useful surfactants are nonylphenoxypolyethyleneoxy ethanol sulfate, allyl dodecyl sulfosuccinate, alkyl phenoxy polyethylene oxyethanol, sodium lauryl sulfate and mixtures thereof. One preferred surfactant is a mixture of nonylphenoxy polyethyleneoxy ethanol sulfate and allyl dodecyl sulfosuccinate.

The acrylic polymer contains about 1–10% by weight of polymerized methylol methacrylamide, methylol acrylamide or any mixtures thereof.

The acrylic polymer preferably contains sufficient polymerized hydroxy alkyl methacrylate or acrylate having 2–4 carbon atoms in the alkyl group to provide the polymer with a hydroxyl no. of 2–100. Usually, about 2–10% by weight of hydroxy alkyl acrylate or methacrylate is used. Typically useful monomers are hydroxyethyl acrylate, hydroxypropyl methacrylate, hydroxybutyl methacrylate, hydroxyethyl methacrylate, hydroxylpropyl acrylate. Other useful polymerizable constituents are reaction products of an alkyl methacrylate or acrylate and a lactone. A constituent of this type is "Tone" 100 made by Union Carbide which is believed to be the reaction product of hydroxyethyl acrylate and a lactone.

The acrylic polymer also contains sufficient polymerized monoethylenically unsaturated acid monomers. Typically useful monoethylenically unsaturated acids are methacrylic acid, acrylic acid, itaconic acid, styrene sulfonic acid and salts thereof. Usually, these unsaturated acids are used in an amount of about 0.1–10 by weight, based on the weight of the polymer.

The remaining constituents of the acrylic polymer are polymerized alkyl acrylates and/or methacrylates preferably having about 1–12 carbon atoms in the alkyl group. These constituents are blended to provide the desired polymer glass transition temperature. Typically useful monomers are methyl methacrylate, ethyl acrylate, propyl acrylate, propyl methacrylate, butyl methacrylate, isobutyl methacrylate, butyl acrylate, isobutyl acrylate, hexyl acrylate, hexyl methacrylate, 2-ethylhexyl methacrylate, 2-ethylhexyl acrylate, lauryl methacrylate and the like. Also, up to about 20% by weight of styrene can be used to form the acrylic polymer.

The acrylic polymer can contain about 0.1–5% by weight of carbodiimides or polyfunctional aziridines which provide the polymer with additional crosslinking sites. Typically useful carbodiimides have the following structural formula:

where R1 and R2 are alkyl groups containing 1–8 carbon groups. One particularly useful carbodiimide is "UCARLNK" Crosslinker XL-25SE made by Union Carbide Corporation.

Useful polyfunctional aziridines include trimethylolpropane-tris-[B-(N-aziridinyl)propionate] and pentaerythritol-tris-[B-(N-aziridinyl)propionate].

The following are particularly useful acrylic polymers:

an acrylic polymer containing about 30–40% by weight methyl methacrylate, 10–20% by weight styrene, 35–45% by weight 2-ethylhexyl acrylate, 1–6% by weight methylol methacrylamide, 1–5% by weight hydroxyetnyl acrylate and 1–5% by weight methacrylic acid;

an acrylic polymer containing about 25–35% by weight methyl methacrylate, 10–20% by weight styrene, 45–55% by weight 2-ethylhexyl acrylate, 1–6% by weight methylol methacrylamide, 1–5% by weight hydroxyethyl acrylate and 1–5% by weight methacrylic acid;

an acrylic graft copolymer of stage I of 10–30% by weight of methyl methacrylate, 1–5% by weight methylol methacrylamide, 70–89% by weight butyl acrylate grafted to stage II of 70–80% by weight of butyl acrylate, 5–15% by weight methylol methacrylamide, 5–15% by weight hydroxyethyl acrylate and 5–9% by weight methacrylic acid.

a three stage acrylic graft copolymer polymer, wherein stage I and stage II each comprise methyl methacrylate and butyl acrylate, and stage III comprises methyl methacrylate, butyl acrylate and methylol methacrylamide.

Typical polyurethanes that are used in the coating composition are in the form of an aqueous dispersion and have a particle size of less than 0.1 microns. These polyurethanes are formed by reacting a polyester, polyether, polycarbonate, polylactone or polyacrylate having terminal hydroxyl groups with a diisocyanate in a molar ratio such that the resulting intermediate product has terminal isocyanate groups. Then the isocyanate groups of this intermediate product are reacted with a compound which has a group that is reactive with the isocyanate groups and has at least one group that is capable of forming an anion. This group is subsequently neutralized with a tertiary amine to form a water dispersible polyurethane and the resulting polyurethane is then chain extended in water with a diamine by reaction of the diamine With unreacted isocyanate groups of the polyurethane. A process for making such polyurethanes in aqueous dispersion is disclosed in Drexler et al U.S. Pat. No. 4,489,135 issued Dec. 18, 1984 which is hereby incorporated by reference.

Typical polyester urethanes are formed by preparing a polyester polyol from a polyol and a dicarboxylic acid or an anhydride. Useful acids include succinic acid, adipic acid, suberic acid, azelaic acid, sebacic acid, phthalic acid, isophthalic acid, maleic acid and anhydrides of these acids. Useful diols include ethylene glycol, butylene glycol, neopentyl glycoi, hexane diol or mixtures of any of the above. The polyester polyol is reacted with suitable diisocyanate in a molar ratio of polyol to diisocyanate of about 1:2 to form an isocyanate terminated product.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersability are trimethylamine, triethylamine, dimethylaniline, diethylaniline, triphenylamine and the like.

Diamines suitable for chain extension of the polyurethane to give N-alkylurea groups are as follows: ethylenediamine, diaminopropane, hexamethylene diamine, hydrazine, aminoethylethanolamine and the like.

Typical polylactones that can be used to form the polyurethane can be lactones such as caprolactone reacted with a diol. Other useful lactones can be represented by the formula

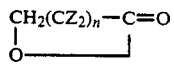

in which n is preferably 4 to 6 and Z is hydrogen, an alkyl radical, a cylcoalkyl radical or an alkoxy radical and does not contain more than 12 carbon atoms. The most preferred lactone is epsilon caprolactone since it is readily available and provides a coating with excellent properties. Typically useful aliphatic diols that can be used to form the polylactone are ethylene glycol, 1,3-propanediol, 1,4-butanediol, and dimethylolcylcohexane. Polycaprolactone glycol is another useful constituent.

Typical polyethers that can be used to form the polyurethane are polypropylene glycols having a weight average molecular weight of about 400–4500. Typical polypropylene glycols that can be used are those designated as "Niax" polypropylene glycols 425, 2025, 3025, 4025 and the like. The numbers designate the molecular weight of the polypropylene glycols.

One useful polyester urethane is the reaction product of isophorone diisocyanate, polycaprolactone glycol, trimethylol propane, a polyester of 3-methyl-1,5-pentane diol and adipic acid, dimethylolpropionic acid and is neutralized with triethylamine and has a number average molecular weight of 20,000–30,000.

Typical hydroxyl terminated polyacrylates that can be used to form the polyurethane are prepared by ethylenic polymerization of acrylic esters such as the aforementioned alkyl acrylate or methacrylates with ethylenic unsaturated monomers containing functional groups such as carboxyl, hydroxyl, cyano groups and/or glycidyl groups. Any of the aforementioned alkyl acrylates and methacrylates can be used. Typically useful functional monomers are acrylic acid, methacrylic acid, 2-hydroxyethyl methacrylate, 2-hydroxypropyl methacrylate, any of the other aforementioned hydroxyalkyl acrylates or methacrylates, glycidyl methacrylate or acrylate, 2-cyanoethyl acrylate or methacrylate and the like.

These polylactones, polyethers or polyacrylates are reacted as shown above for the polyester to form an aqueous polyurethane dispersion.

Alkylated melamine crosslinking agents used in the coating composition are water-soluble or water-dispersible. These crosslinking agents are generally partially methylated melamine formaldehyde and polymeric and have a degree of polymerization of about 1–3. The following are preferred melamine crosslinking agents that are commercially available:

"Cymel" 373 is a polymeric partially methylated melamine formaldehyde resin having a degree of polymerization of 2.3;

"Cymel" 385 is a polymeric partially methylated melamine formaldehyde resin having a degree of polymerization of 2.1;

"Resimine" 714 is a polymeric partially methylated melamine formaldehyde resin;

"Resimine" 730 and 731 are polymeric partially methylated melamine formaldehyde resins having a degree of polymerization of 1.6;

"Resimine" 735 and 740 are polymeric partially methylated melamine formaldehyde resins having a degree of polymerization of 1.7 and 1.6 respectively.

Typical pigments that can be used in the composition are metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones and the like.

When the coating contains metallic pigments, agents which inhibit the reaction of the pigments with water may be added. Typical inhibitors are phosphated organic materials such as "Vircopet" 40 available from Mobil Chemical Co.

The pigments can be introduced into the coating composition by first forming a mill base or pigment dispersion with either the methylol (meth)acrylamide acrylic polymer or the polyurethane or with another compatible polymer or dispersant by conventional techniques such as high speed mixing, sand grinding, ball milling, attritor grinding or two roll milling. The mill base is blended with other constituents used in the composition.

The coating composition can contain about 0.01–2% by weight, based on the weight of the binder, of ultraviolet light stabilizers which includes ultraviolet light absorbers, screeners and quenchers. Typical ultraviolet light stabilizers include benzophenones, triazines, triazols, benzoates, hindered amines and blends thereof.

Thickeners and rheology control agents can be added to the coating composition in amounts of about 0.5–10% by weight of the coating composition to provide the desired spray viscosity. Typically, acrylic polymers such as polyacrylic acid, clays such as "Bentones", cellulosics, silicas, associative thickeners such as "Rheolate" 255, polysaccharides, urethanes or compatible mixtures of any of the above can be added.

The coating composition can contain about 0.1–1.0%, based on the weight of the binder, of a strong acid catalyst or a salt thereof. Paratoluene sulfonic acid is a preferred catalyst or its ammonium salt. Other catalysts that can be used are dodecyl benzene sulfonic acid, phosphoric acid and amine or ammonium salts of these acids.

With relatively high glass transition temperature methylol (meth)acrylamide acrylic polymers, i.e. polymers having a glass transition temperature of about 10°–40° C., it is preferred to use up to about 10% by weight, based on the weight of the coating composition, of a coalescing solvent. Typical coalescing solvents that can be used are dibasic acid esters, glycol ethers such as propylene glycol ether and ethylene glycol ether and mixtures thereof.

The coating composition can be applied to a plastic or metal substrate by conventional techniques such as spraying, electrostatic spraying, dipping, brushing, flowcoating and the like. The preferred method is spraying. After application, the composition is baked at about 90°–150° C. for about 5–45 minutes to form a coating layer about 0.1–2.0 mils thick. Generally the layer is about 0.5–1.5 mils thick.

The coating composition of this invention must be cured at an elevated temperature for a sufficient time to react the melamine crosslinking agent with the acrylic polymer and polyurethane to form a fully cured and crosslinked finish. An elevated temperature of 90° C. and up to 150° C. is used.

To test for crosslinking and complete curing of the resulting finish, it should withstand 100 double rubs with MEK (methyl ethyl ketone) according to ASTM test method D4742-87 as adapted for general coatings.

For clear coat/color coat systems a clear layer which can either be a solvent based aqueous based composition is applied over the pigment color coat of this invention and baked or dried at ambient temperatures to form a dry film having a thickness of about 1.5–2.5 mils. Aqueous based clear coating compositions of this invention also can be used. Acrylic silane aqueous or solvent based compositions can be used as the clear layer.

If the coating composition of this invention is used as a clear layer, it is preferred to use an acrylic polymer in the composition that contains about 0.1–5% by weight of one of the aforementioned carbodiimide or aziridinyl crosslinkers.

A primer composition can be prepared from the coating composition of this invention. One preferred acrylic polymer useful for primers contains about 35% methyl methacrylate, 15% styrene, 39% 2-ethylhexyl acrylate, 3% methylol methacrylamide, 3% 2-hydroxy ethyl acrylate and 3% methacrylic acid. Typical primer pigments are used in a pigment to binder ratio of about 150:100 to 200:100. The primer composition can be applied to all of the aforementioned substrates using the above application techniques. Preferably, the primer is applied by spraying. The primer can be baked as above to form a dry film about 0.5–3.0 mils thick. The primer has excellent adhesion to metals and previously painted metal substrates.

The following example illustrates the invention. All parts and percentages are on a weight basis unless otherwise indicated. Molecular weights are determined by gel permeation chromatography using polystyrene as the standard.

EXAMPLE 1

A coating composition is prepared by first forming an methylol (meth)acrylamide acrylic polymer latex and then mixing the latex with the other components used in the coating composition.

| Latex A | Parts by Weight |
| --- | --- |
| Portion 1 | |
| Deionized water | 1318.0 |
| Nonylphenoxy polyethyleneoxy ethyl sulfate (4 moles EO) | 5.0 |
| Allyl dodecyl sulfosuccinate sodium salt | 7.0 |
| Portion 2 | |
| Deionized water | 40.0 |
| Ammonium persulfate | 4.0 |
| Portion 3 | |
| Methyl methacrylate monomer (MMA) | 576.0 |
| Styrene monomer (S) | 240.0 |
| 2-Ethyl hexyl acrylate (2-EHA) | 640.0 |
| N-methylol methacrylamide (MOLMAN) | 87.0 |
| Methacrylic acid monomer (MAA) | 48.0 |
| Nonylphenoxy polyethyleneoxy ethyl sulfate | 14.0 |
| Allyl dodecyl sulfosuccinate sodium salt | 20.0 |
| Deionized water | 908.0 |
| Portion 4 | |
| Deionized water | 30.0 |
| Aqueous ammonium hydroxide solution (29% aqueous solution) | 45.0 |
| Methanol[[[(2-dihydro-5-methyl-3(2H)-oxazolyl)-1-methylethoxy]methoxy]methoxy] | 4.0 |
| Total | 4034.0 |

Portion 1 was added to a reaction vessel equipped with a heating mantle, stirrer, thermometer, reflux condenser and two addition funnels. The resulting mixture was heated to 85° C. with mixing. Portion 2 was placed in a vessel attached to an addition funnel. Portion 3 was emulsified with an Eppenbach homogenizer. 5% of the resulting emulsion was added to the reaction vessel and the temperature of the constituents in the vessel was stabilized at 85° C. Portion 2 was then added and held for 5 minutes and then the remainder of the Portion 3 emulsion was added over a period of 90 min. at a uniform rate. The temperature of the resulting polymerization mixture was maintained at 88°–90° C. during the addition. The polymerization mixture was held at the above temperature for about 1 hour. The polymerization mixture was cooled to 35° C. and then Portion 4 was added to neutralize the latex.

The resulting latex polymer had the following composition: MMA/S/2-EHA/MOLMAN//HEA/MAA in a weight ratio of 36/15/40/3/3/3. The polymer had a weight average molecular weight of about 500,000–1,250,000. The latex had a polymer particle size of 0.095 microns, a gallon weight of 8.55 lbs/gal, pH of 8.77, percent weight solids of 38.9 and a percent volume solids 37.2.

A Primer Composition was prepared as follows:

A. Millbase preparation:

The following ingredients were premixed and then ground in an attritor:

| | Parts by Weight |
| --- | --- |
| Deionized water | 150.84 |
| Aqueous ammonium hydroxide solution (29% solution) | 1.73 |
| "Tamol" 901 (made by Rohm & Hass, ammonium | 0.83 |

|  | Parts by Weight |
|---|---|
| salt of acrylic copolymer dispersant) | |
| "Igepal" CO-990 (nonyl phenoxy polyethyleneoxy ethanol 99 moles EO) | 3.75 |
| Talc pigment | 114.90 |
| Aluminum silicate pigment | 57.47 |
| Carbon black pigment (Printex U) | 0.37 |
| Titanium dioxide pigment | 18.90 |
| Anticorrosive pigment (calcium strontium phosphosilicate) | 25.54 |
| Zinc phosphate pigment | 38.25 |
| Total | 412.58 |

B. Primer preparation:

The following ingredients were added in order with mixing:

|  | Parts by Weight |
|---|---|
| Deionized water | 76.82 |
| "Igepal" CO-990 (described above) | 0.12 |
| "Texanol" (2,4 trimethyl 1,3 pentane diol monoisobutyrate) | 11.72 |
| Pine Oil | 9.38 |
| "Butyl Cellosolve" (ethylene glycol monobutyl ether) | 5.86 |
| Methanol | 29.30 |
| Mill Base (prepared above) | 412.58 |
| Latex A (prepared above) | 318.12 |
| Polyether Urethane Latex ("Neorez" R-970, ICI resin - 30% solids of aliphatic polyurethane having a particle size of about 0.1 micron) | 70.71 |
| "Cymel" 385 solution (79% solids in water of a polymeric partially methylated melamine formaldehyde resin having a degree of polymerization of 2.1 and the solution has a viscosity of 8-13 poise at 25° C.) | 20.63 |
| Blend 1 (deionized water 11.89, "Butyl Cellosolve" 3.19, aqueous ammonium hydroxide solution - described above 0.86) | 15.94 |
| Blend 2 (deionized water 23.57, "Butyl Cellosolve" 3.58, aqueous ammonium hydroxide solution 1.57 and "Acrysol" TT615 - Rohm & Haas acrylic acid copolymer thickner 4.10) | 32.82 |
| Total | 1004.00 |

The resulting primer composition has a solids content of 40%, and a pigment/binder ratio of 150:100.

The primer was sprayed onto cold-rolled steel panels and baked at 100° C. for 30 minutes. The primer had a dry film thickness of about 1.8-2.2 mils. The panels were then spray-coated with a two component acrylic urethane base coating composition and a two component acrylic urethane clear coating composition and baked at 100° C. for 30 minutes. The resulting basecoat had a dry film thickness of about 0.9-1.2 mils and the clear coat had a dry film thickness of about 1.8-2.1 mils and had an excellent appearance, i.e., good gloss and distinctness of image.

Steel panel spray coated with the primer and dried as above had the following properties:
  Dry film build-1.8-2.2 mils
  Adhesion (96 hrs humidity 38C/100% RH)-good
  Corrosion resistance (240 hrs. salt spray)Excellent-creep less than ⅛ inch.

Silver Basecoat Composition

The following ingredients were combined in the order indicated and mixed for 30 minutes:

|  | Parts by Weight |
|---|---|
| Ethylene glycol monobutyl ether | 32.00 |
| Passivator solution (Phosphated organic inhibitor 53.82 parts, ethylene glycol monobutyl ether 43.34 parts, dimethyl ethanol amine 2.84 parts) | 9.72 |
| "Cymel" 385 solution (described above) | 25.00 |
| Aluminum flake dispersion (65% solids aluminum flake in mineral spirits) | 23.08 |
| Latex A (prepared above) | 152.94 |
| Polyether urethane latex (described above) | 50.00 |
| Thickener solution (77.35 parts deionized water, 10.71 parts "acrysol" ASE-60 thickener from Rohm & Haas Co. - polyacrylic acid acrylic copolymer emulsion, 11.94 parts dimethyl ethanol amine) | 66.67 |
| Amine solution (10% dimethyl ethanol amine in water) | 5.00 |
| Total | 574.40 |

The resulting coating composition had a volume solids of 16.58%, a pigment to binder ratio of 8.54/100 and a volatile organic content of 2.74

The silver basecoat was sprayed onto cold-rolled steel panels, primed with the above primer and flash dried. The panels were then spray-coated with the clear coating composition of a two component solvent based acrylic/urethane clear and baked at 100° C. for 30 minutes. The resulting basecoat had a dry film thickness of about 0.5-0.8 mils and the clearcoat had a dry film thickness of about 1.8-2.1 mils.

The coating on the panels had the following properties:
  Appearance-excellent
  20 Gloss=96
  Distinctness of Images=96
  Humidity resistance (96 hour at 38C/100% rel. humidity)=excellent
  Gravelometer 6-fair.

EXAMPLE 2

The following constituents can be blended together to form a clear coating composition:

|  | Parts by Weight |
|---|---|
| Portion 1 | |
| Latex A (prepared in Example 1) | 245.1 |
| Portion 2 | |
| Deionized water | 68.6 |
| "Butyl Cellosolve" (described in Example 1) | 30.0 |
| Polyurethane composition ("Spensal L-52 aliphatic polyurethane) | 80.0 |
| "Cymel" 385 solution (described in Example 1) | 15.3 |
| Portion 3 | |
| Byk 307 (acrylic flow control agent) | 0.6 |
| Ultraviolet light stabilizers | 4.0 |
| "Acrysol" TT-615 Acrylic Thickener (described in Example 1) | 0.5 |
| Total | 444.1 |

Portion 1 was charged into a mixing vessel and Portion 2 was premixed and charged into the mixing vessel and thoroughly mixed with Portion 1 and the constituents of Portion 3 were added in the order shown with mixing to form the clear coating composition. The above clear coating composition was sprayed onto primed steel panels coated with the silver basecoating composition of Example 1. It is expected that the resulting clear coated panels will have excellent clarity, good gloss and distinctness of image, good water spot resistance, good solvent resistance and excellent chip resistance.

EXAMPLE 3

A white basecoat was prepared by blending together the following constituents in the order shown:

|  | Parts by Weight |
|---|---|
| Aqueous titanium dioxide pigment slurry (76.5% solids) | 130.72 |
| Latex A (prepared in Example 1) | 162.46 |
| "Cymel" 385 solution (described in Example 1) | 25.00 |
| Polyurethane composition (described in Example 1) | 50.00 |
| Ethylene glycol monobutyl ether | 41.00 |
| Deionized water | 10.00 |
| Amine solution (10% dimethyl ethanol amine) | 3.00 |
| "Acrysol" ASE-60 (from Rohm & Haas) | 7.50 |
| Total | 429.68 |

The resulting coating composition had a volume solids of 32.61%, a pigment to binder weight ratio of 100/100 and a volatile organic content of 2.2 pounds per gallon.

The white basecoat was sprayed onto cold roll steel panels electrocoated with an ED-11 electrocoat primer and flash dried at 82° C. for 5 minutes. The panels were spray coated with a clear coating composition of a two component acrylic/urethane clear coat and baked for 30 minutes at 105° C. The white basecoat had a dry film thickness of about 1.0–1.2 mils and a clear coat dry film thickness of 1.8–2.1 mils.

The resulting panels had an excellent visual appearance, gloss of 94, distinctness of image 95, chip resistance as measured by an gravelometer of 7 and excellent humidity resistance at 96 and 240 hours exposure.

A second white basecoat composition was prepared identical to the above composition except the "Cymel" component was omitted. The above prepared white basecoat and the second white basecoat were each sprayed onto separate cold roll steel panels having an ED-11 electrocoat primer and the panels were baked for 30 minutes at 99° C. Each panel was tested for solvent resistance using MEK double rubs. The results were as follows:

White basecoat containing "Cymel" 385-100+ rubs
Second white basecoat without "Cymel" 385-6-8 rubs This showed that the panel finished with the white basecoat containing "Cymel" 385 melamine resin was substantially better crosslinked than the basecoat of the second panel. The first white basecoat forms an acceptable automotive quality finish while the second does not.

What is claimed is:

1. A waterbased coating composition comprising about 10-30% by weight of film forming binder dispersed in an aqueous carrier; wherein the binder consist essentially of about
   a. 20-85% by weight, based on the weight of the binder, of an methylol (meth)acrylamide acrylic polymer consisting essentially of polymerized monomers of alkyl methacrylate, alkyl acrylate or mixtures thereof, 1-10% by weight, based on the weight of the acrylic polymer of methylol methacrylamide, methylol acrylamide or mixtures thereof, 0.5-10% by weight, based on the weight of the acrylic polymer of an ethylenically unsaturated carboxylic acid, 0.5-10% by weight, based on the weight of the acrylic polymer, of an ethylenically unsaturated hydroxyl containing monomer and the acrylic polymer has a glass transition temperature of $-40°$ to $+40°$ C. and a weight average molecular weight of 500,000 to 3,000,000; and the carboxyl groups of the carboxylic acid are reacted with ammonia to provide a pH of about 7.0-10;
   b. 10-40% by weight, based on the weight of the binder, of a polyurethane selected from the group consisting of polyester urethane, polyether urethane or polyacrylourethane; and
   c. 5-40% by weight, based on the weight of the binder, of a water-soluble or a water-dispersible alkylated melamine formaldehyde crosslinking agent consisting essentially of a polymeric partially methylated melamine formaldehyde resin having a degree of polymerization of about 1-3.

2. The coating composition of claim 1 containing pigment in a pigment to binder weight ratio of about 1:100-200:100.

3. The coating composition of claim 1 in which the acrylic polymer consists essentially of polymerized monomers of an alkyl methacrylate, an alkyl acrylate or mixtures thereof each having 1-12 carbon atoms in the alkyl group, 2-10% by weight of a hydroxy alkyl methacrylate or acrylate having 2-4 carbon atoms in the alkyl group, 0.1-10% by weight of a monoethylenically unsaturated carboxylic acid and 1-10% by weight of methylol acrylamide, methylol methacrylamide or mixtures thereof.

4. The coating composition of claim 1 in which the acrylic polymer contains up to 20% by weight of polymerized styrene.

5. The coating composition of claim 1 in which the acrylic polymer consists essentially of about 30-40% by weight methyl methacrylate, 10-20% by weight of styrene, 35-45% by weight of 2-ethylhexyl acrylate, 1-6% by weight methylol methacrylamide, 1-5% by weight of hydroxyethyl acrylate and 1-5% by weight methacrylic acid.

6. The coating composition of claim 4 in which the acrylic latex polymer consists essentially of 25-35% by weight methyl methacrylate, 10-20% by acrylate, 1-6% by weight methylol methacrylamide, 1-5% by weight hydroxy ethyl acrylate and 1-5% by weight methacrylic acid.

7. The coating composition of claim 1 in which the acrylic polymer is a graft copolymer consisting essentially of stage I of 10-30% by weight of methyl methacrylate, 1-5% by weight of methlylol methacrylamide and 70-89% by weight butyl acrylate grafted to stage II of 70-80% by weight of butyl acrylate, 5-15% by weight methylol methacrylamide, 5-15% by weight of hydroxyethyl acrylate and 5-9% by weight methacrylic acid.

8. The coating composition of claim 1 in which the acrylic polymer is a graft copolymer consisting essentially of stages I, II and III, wherein stages I and II comprise methyl methacrylate, butyl acrylate and stage III comprises methyl methacrylate, butyl acrylate and methylol methacrylamide.

9. The coating composition of claim 1 containing about 0.1-5% by weight based on the weight of the acrylic polymer, of a crosslinking agent of a carbodiimide or a polyfunctional aziridine.

10. The coating composition of claim 1 in which the polyurethane is a polyester urethane.

11. The coating composition of claim 10 in which the polyester urethane consists essentially of polyester polyol of a polyol and a dicarboxylic acid or an anhydride thereof, said polyester polyol is reacted with an organic diisocyanate which in turn is reacted with a hydroxy containing carboxylic acid, said acid being neutralized with a tertiary amine and the resulting product chain extended with a diamine.

12. The coating composition of claim 11 in which the polyester urethane consists essentially of a polyester polyol of a lactone reacted with a polyol, said polyester polyol is reacted with an organic diisocyanate which in turn is reacted with a hydroxy containing carboxylic acid, said acid being neutralized with a tertiary amine and the resulting product chain extended with a diamine.

13. The coating composition of claim 10 in which the polyurethane is the reaction product of isophorone diisocyanate, polycaprolactone polyol, trimethylolpropane, polyester of pentanediol and adipic acid, dimethylolpropionic acid and neutralized with triethylamine.

14. The coating composition of claim 1 in which the polyurethane is a polyether urethane.

15. The coating composition of claim 14 in which the polyether urethane consists of a polyalkylene glycol having a weight average molecular weight of about 400-4500, said polyalkylene glycol is reacted with an organic diisocyanate which in turn is reacted with a hydroxy containing carboxylic acid, said acid being neutralized with a tertiary amine and the resulting product chain extended with a diamine.

16. The coating composition of claim 15 in which the polyalkylene glycol consists essentially of polypropylene glycol.

17. The coating composition of claim 1 in which the polyurethane is a polyacrylourethane.

18. The coating composition of claim 17 in which the polyacrylourethane consists essentially of a functional acrylic polymer of polymerized ethylenically unsaturated acrylic esters and ethylenically unsaturated monomers containing functional groups selected from the group consisting of carboxyl, hydroxyl, cyano, or glycidyl groups, said functional acrylic polymer is reacted with diisocyanate which in turn is reacted with a hydroxy containing carboxylic acid, said acid being neutralized with a tertiary amine and the resulting product chain extended with a diamine.

19. The coating composition of claim 1 in which the acrylic polymer consists essentially of polymerized monomers of an alkyl methacrylate, an alkyl acrylate or mixtures thereof each having 1-12 carbon atoms in the alkyl group, 2-10% by weight of a hydroxy alkyl methacrylate or acrylate having 2-4 carbon atoms in the alkyl group, 0.1-10% by weight of a monoethylenically unsaturated carboxylic acid and 1-10 by weight of methylol acrylamide, methylol methacrylamide or mixtures thereof; and in which the polyurethane is a polyester urethane consisting essentially of a polyester polyol of a polyol and a dicarboxylic acid or an anhydride thereof said polyester polyol is reacted with an organic diisocyanate which in turn is reacted with a hydroxy containing carboxylic acid said acid being neutralized with a tertiary amine and the resulting product chain extended with a diamine and the crosslinking agent comprises a polymeric partially methylated melamine formaldehyde resin having a degree of polymerization of about 1-3.

* * * * *

UNITED STATES PATENT AND TRADEMARK OFFICE
CERTIFICATE OF CORRECTION

PATENT NO. : 5,314,945
DATED : May 24, 1994
INVENTOR(S) : Stanley K. Nickle and Ervin R. Werner, Jr.

It is certified that error appears in the above-identified patent and that said Letters Patent is hereby corrected as shown below:

Claim 1, Column 11, line 63, delete "consist" and insert --consists--.
Claim 1, Column 11, line 66, delete "an" and insert --a--.

Claim 6, Column 12, line 50, after "by" insert --weight stryrene, 45-55% by weight 2-ethylhexyl--.

Signed and Sealed this

Twentieth Day of September, 1994

*Attest:*

BRUCE LEHMAN

*Attesting Officer*     Commissioner of Patents and Trademarks